Patented Mar. 30, 1943

2,314,936

UNITED STATES PATENT OFFICE 2,314,936

PROCESS FOR EXTRACTING AND CONCENTRATING SULPHUR DIOXIDE

Léon Jean Baptiste Guyard, Paris, France; vested in the Alien Property Custodian No Drawing. Application December 4, 1940, Serial No. 368,537. In France October 16, 1939

6 Claims. (Cl. 23—178)

Amongst the methods for extracting and concentrating sulphur dioxide from gaseous mixtures containing the same, the most numerous are those which use the solubility of sulphur dioxide in various liquids, viz: water, certain organic solvents or saline solutions. But these methods have practical drawbacks: with water, which dissolves little sulphur dioxide, dissolution is sometimes effected under pressure, which increases expenditure of energy and complicates the apparatus; with organic solvents, owing to their volatility, there are losses by carrying away; with saline solutions, which are often unstable, chemical changes of the liquors and clogging of the apparatus are observed.

The present invention relates to a process for absorbing sulphur dioxide from a gaseous mixture, roasting gas for example, which process eliminates the drawbacks mentioned above and enables pure or industrially pure sulphur dioxide to be obtained which is suitable, in particular, for liquefaction.

The invention is based on the following observation: An aqueous solution of basic salts of glucinum, in particular of glucinum sulphate (also called beryllium sulphate) has the property of dissolving a considerable quantity of gulcina (glucinum oxide or hydroxide). There is probably formed a basic sulphate, which is soluble. This basic solution is an excellent solvent for sulphur dioxide, of which it can dissolve considerable quantities at room temperature. If this solution is then heated near its boiling point, or to a slightly lower temperature, it gives off its sulphur dioxide which may be evolved in the concentrated and pure state.

The superiority of the solutions of basic glucinum sulphate over solutions that have similar properties, consists in the fact that they withstand, without decomposition, evaporation, heating, concentration and all the accidental causes which hydrolyse the salts of the neighbouring metals and produce the formation of precipitates. The solutions of basic glucinum sulphate can be brought to dryness without precipitating or crystallizing; their concentration gives rise to a progressive thickening as would a syrup; when they are restored to their initial concentration by the addition of water, they re-dissolve completely.

It may occur, on the contrary, that too much dilution causes a precipitation; it is sufficient to restore the initial concentration in order to re-dissolve the precipitate.

It follows from these remarks that an apparatus supplied with a solution of basic glucinum salt is much easier to control than those containing other basic salts, since a local or general overheating cannot cause the reagent to decompose.

The solubility of $SO_2$ increases with the concentration of free glucina dissolved in the glucinum sulphate. It is this free glucina which is the active agent.

In practice the sulphate concentration is between saturation and 50% of said saturation. The glucina which is added is kept slightly less (between 75 and 100%) than double the glucina of the sulphate in order to prevent the pipes from clogging. The ratio of the excess of glucina or glucinum oxide in the sulphate solution over that which is present in the normal sulphate solution, to the total glucinum oxide content provides a measure of the basicity of the solution which may be expressed as a percentage value.

The extraction of the sulphur dioxide contained in a gaseous mixture may be effected by means of the solution of basic glucinum sulphate by carrying out the following cycle of operations:

1. Placing the liquor in contact with the gases to be treated: the liquor absorbs the sulphur dioxide. This operation is effected by bubbling or by a counter-current in a column. It can also be effected under pressure. The gas and the liquor are at room temperature, in any case at the lowest temperature possible.

2. Heating the liquor charged with sulphur dioxide in a chamber, wherein said sulphur dioxide is evolved in the concentrated and pure state.

3. Cooling the liquor which has lost its sulphur dioxide and returning it to the first phase of absorption.

Phases 2 and 3 may, for example, be partly carried out in a heat exchanger wherein the liquor charged with sulphur dioxide is heated while the discharged liquor cools. The removal of the gas from the liquor, in phase 2, may be effected either at atmospheric pressure, or with the help of a vacuum, therefore in this case at lower temperature.

The practical realization of the foregoing cycle is effected according to the classical methods used with other solvents.

The basic glucinum sulphate liquor may be prepared by various methods, in particular by operating as follows:

1. The glucina (glucinum oxide or hydroxide) or the $GlCO_3$ is dissolved in a solution of glucinum sulphate.

2. The glucina or the carbonate is dissolved in a smaller quantity of sulphuric acid than that which corresponds to the neutral sulphate.

3. The acid which is combined in a solution of glucinum sulphate is partially precipitated. Precipitation is effected by means of any substance which produces an insoluble sulphate, lime, limestone, baryta in particular.

The conditions of solubility of the glucina in the glucinum sulphate liquor, and the use of said liquor for absorbing sulphur dioxide will be clearly apparent from the following example:

A liquor containing per litre 435 gm. of hydrated glucinum sulphate GlSO₄, 4H₂O, which corresponds to 61 gm. of glucina GlO, can dissolve up to twice this weight of glucina, viz: 122 gm. In order to prevent precipitation of basic sulphate during the operations, avoid saturating this liquor with glucina; only 109 gm. of glucina for example, should be dissolved therein. Thus the basicity of the solution containing 109 gm. glucina in excess over the 61 gm. present in the normal sulphate may be expressed as a percentage value by the ratio of $$\frac{\text{excess glucina}}{\text{total glucina}}$$

substituting the specified quantities, the ratio becomes $$\frac{109}{109+61}$$

which is approximately a 64% basicity.

This liquor when placed in contact with gas containing 4% by volume of sulphur dioxide absorbs per litre 186 gm. of sulphur dioxide at the temperature of about 20° C. For gases containing 7%, the absorption is 196 gm. of sulphur dioxide per litre. If it is then heated to boiling point, either at atmospheric pressure, or in a more or less high vacuum, the liquor restores nearly all the sulphur dioxide absorbed.

There is in reality a small loss, less than 1%, which corresponds to the fraction of sulphur dioxide which is oxidized to the state of sulphuric acid during the treatments. Consequently, the liquor slowly becomes charged with sulphuric acid, its total glucina content remaining constant; in other words, its basicity decreases. If this basicity decreases too much, the power of absorption of sulphur dioxide might be reduced. It is therefore necessary to regenerate the liquor frequently.

The regeneration is effected very simply by precipitating the excess of sulphuric acid of the liquor by means of lime, baryta, limestone, witherite, lead oxide or carbonate. In practice, only a fraction of the liquor drawn off from the circuit is regenerated in this manner, and the regenerated liquor is then returned thereto.

Small quantities of impurities, for example a few per cent of aluminium sulphate, do not affect the absorbent properties of the solutions of basic glucinum salts. It is known that glucinum ore, which is beryl, contains aluminium; when beryl is treated for manufacturing glucina, the latter is obtained in general mixed with alumina which is difficult to separate. In order to reduce the cost of manufacture, it is therefore possible to be content with glucina which is more or less charged with alumina. With this impure glucina, it is possible to prepare a mixed liquor of basic glucinum sulphate and basic aluminium sulphate, and this liquor can be used for concentrating sulphur dioxide. In this liquor, the glucina and the alumina act in this case in a parallel manner. But there is a risk of easier incrustations, particularly in the hot parts of the circuit, and some precautions have to be taken to prevent them.

I claim:

1. The process for extracting sulphur dioxide from a gas containing the same which comprises contacting said gas with an aqueous solution of basic glucinum sulphate wherein the basicity of the solution, determined by the excess of glucinum oxide present, over that occurring in the normal sulphate, to the total glucinum oxide content, is substantially in excess of approximately 50%.

2. The process for extracting and concentrating sulphur dioxide from a gas containing the same which comprises contacting said gas with an aqueous solution of basic glucinum sulphate wherein the basicity of the solution, determined by the excess of glucinum oxide present, over that occurring in the normal sulphate, to the total glucinum oxide content, is substantially in excess of approximately 50%, and recovering sulphur dioxide from said solution.

3. The process for extracting and concentrating sulphur dioxide from a gas containing the same which comprises contacting said gas with an aqueous solution of basic glucinum sulphate at substantially normal atmospheric temperature, wherein the basicity of the solution, determined by the excess of glucinum oxide present, over that occurring in the normal sulphate, to the total glucinum oxide content, is substantially in excess of approximately 50%, heating said solution to regenerate sulphur dioxide therefrom, cooling the resulting liquor and recycling the same.

4. A cyclic process for extracting and concentrating sulphur dioxide from a gas containing the same which comprises contacting said gas with an aqueous solution of basic glucinum sulphate at substantially normal atmospheric temperature and superatmospheric pressure, wherein the basicity of the solution, determined by the excess of glucinum oxide present, over that occurring in the normal sulphate, to the total glucinum oxide content, is substantially in excess of approximately 50%, heating said solution to regenerate sulphur dioxide therefrom, passing the resulting liquor in heat exchange relationship to basic sulphate solution containing absorbed sulphur dioxide, and recycling the said liquor, the basicity of the said liquor being at intervals readjusted to the predetermined value.

5. The process for extracting and concentrating sulphur dioxide from a gas containing the same which comprises contacting said gas with an aqueous solution of basic glucinum sulphate at substantially normal atmospheric temperature, said solution containing added glucinum oxide, in excess of that occurring in normal glucinum sulphate, in an amount between approximately 75 and 100% of double the glucinum oxide content of normal glucinum sulphate.

6. The process for extracting and concentrating sulphur dioxide from a gas containing the same which comprises contacting said gas with an aqueous solution of glucinum sulphate at substantially normal atmospheric temperature and superatmospheric pressure, the said glucinum sulphate solution containing added glucina in an amount slightly less than double the glucinum oxide occurring in normal glucinum sulphate, heating the said solution at reduced pressure to regenerate sulphur dioxide therefrom, and cooling and recycling the resultant liquor.

LÉON JEAN BAPTISTE GUYARD.